United States Patent [19]

McGrath

[11] Patent Number: 5,228,617

[45] Date of Patent: * Jul. 20, 1993

[54] PLASTICS MATERIAL REUSABLE RECYCLABLE CARTON

[76] Inventor: Stephen E. McGrath, McCracken's Landing, R.R. 2, Lakefield, Ontario, Canada

[*] Notice: The portion of the term of this patent subsequent to Feb. 9, 2010 has been disclaimed.

[21] Appl. No.: 802,293

[22] Filed: Dec. 4, 1991

[51] Int. Cl.$^5$ .................... B65D 5/30; B65D 5/66
[52] U.S. Cl. .................... 229/127; 206/459.5; 229/148; 229/177; 229/178
[58] Field of Search ............. 229/127, 143, 148, 178, 229/179, 189, 192, 915, DIG. 4; 206/459

[56] References Cited

U.S. PATENT DOCUMENTS

| | | | |
|---|---|---|---|
| 619,757 | 2/1899 | Johnstone et al. | 229/127 |
| 1,141,343 | 6/1915 | Jones | 229/179 |
| 2,105,057 | 1/1938 | Sharpe | 229/127 |
| 2,741,415 | 4/1956 | Meitzen | 229/179 |
| 3,381,880 | 5/1968 | Lewallen et al. | 229/179 |
| 3,727,825 | 4/1973 | Troth | 229/DIG. 4 |
| 3,883,067 | 5/1975 | McGlynn et al. | 229/179 |
| 4,201,307 | 5/1980 | Malloy | 229/189 |
| 4,236,740 | 12/1980 | Sorenson et al. | 229/143 |
| 4,911,355 | 3/1990 | Bannister | 229/143 |
| 4,919,267 | 4/1990 | Stoll | 229/915 |

OTHER PUBLICATIONS

The Wiley Encyclopedia of Packaging Technology, John Wiley & Sons, pp. 412, 413 (1986).

*Primary Examiner*—Gary E. Elkins
*Attorney, Agent, or Firm*—Jane Parsons

[57] ABSTRACT

A re-usable, recyclable, reversible carton is made from recyclable plastics material and is formed from a carton blank adapted for erection without the need for additional closure devices such as glue or staples. The plastics material may be polyethylene and printing on at least one surface may be by use of UV inks on a roughened surface with a view to maximum longevity of the printing. The carton is erected from a knock-down carton blank having releasable engagement tabs and slots to releasably maintain the carton in an erected condition. A two part lid is provided, each part of which may be folded down the side of the carton to allow for the possibility of using the carton for open storage.

10 Claims, 2 Drawing Sheets

PLASTICS MATERIAL REUSABLE RECYCLABLE CARTON

BACKGROUND OF THE INVENTION

1. Field of the Invention

This invention relates to re-usable, recyclable plastics material cartons.

2. Acknowledgement of Prior Art

Cartons such as cartons for glassware, e.g., bottles, jars, etc., have traditionally been made of paperboard, often corrugated paperboard. When the bottles or jars contain consumables, especially food or drink, hygiene, cleanliness in packaging have been a major consideration. Possibly for this reason, packaging food and drink has been largely in inexpensive, disposable cartons which need not be cleaned and re-used. Cartons which are used for returnable items, such as beer bottles are, however, subject to considerable extra stresses since they are often used by the consumer for storage and for return of the bottles. Paper, paperboard and waxed paper are examples of materials which have been used. They have, however, had some disadvantages when used for some purposes, e.g., extended storage in damp conditions.

Plastics materials are also widely used for packaging but not generally in this field. Plastics materials are used, for example, in fully flexible bags or envelopes, for wrapping sheet, for vacuum packed products, for a variety of freezer or microwave containers, for disposable flatware which is capable of limited re-use and as rigid molded containers such as carriers for soft drink bottles. Its use to replace paperboard for general carton use is notably absent. Possibly the closest use to this field is the use of foam plastics materials for food which must be kept hot.

Some of the reasons for this rather notable non-use of plastics materials are various perceived difficulties.

It is important that cartons which are intended for only one use and which, at first, are additionally used for storage and for return of returnable articles, should be inexpensive. Paperboard has remained consistently less expensive than any equivalent plastics material to give the same strength. Moreover, until relatively recently, printing onto plastics material has not been wholly satisfactory and, even now, it is necessary to take special precautions if printing on plastics material is to be hard wearing. Thus, plastics material have not been considered practicable for disposable carton use.

There are now strong pressures on packaging suppliers to be aware of environmental considerations. One specific consideration is to reduce the actual volume of disposable material, e.g., garbage. Another consideration is to make any necessary volume of such disposable material recyclable. At least these two considerations led the inventor to attempt to provide a re-usable, recyclable packaging carton which is environmentally friendly. In attempting to reduce a re-usable carton, the inventor was addressing the problem of actual volume of packaging material produced which must ultimately be disposed of. In addressing the question of a recyclable carton, the inventor was addressing the questions of disposal itself.

If a commonly available recycling technology is to be utilized, paperboard cartons are unsuitable for recycling due to the presence of glue, staples, was or other contaminants. Moreover, paperboard cartons are generally utilizable only once by the supplier even if they are utilized for secondary purposes by the consumer.

The present inventor addressed the use of secondary use by the supplier. He also particularly addressed the problem of secondary use by the consumer for storage purposes and, in this connection, appreciated that the flaps of the top of a carton which formed the lid and which are glued or stapled one to another by the supplier for transport of the contents require the use of glue or staples. Moreover, those flaps are now always of convenience to the consumer who may wish to store the articles in an open container for easy access. Frequently, such flaps are tucked down the sides of the container so that they do not obstruct the top for storage.

SUMMARY OF THE INVENTION

According to the present invention there is provided a carton formed of plastics material comprising a carton body having a rectangular base and walls folded to the base at 90°, each member of one opposing pair of walls having extension panels folded from each end at 90° to be flush with and inside the other opposing pair of walls, and each member of the other opposing pair of walls having a top edge panel folded at 180° to be flush with and inside extension panels of each of the one pair of walls; and a lid moveable between open and closed positions with respect to a carton top defined by top edges of the walls, the lid comprising a pair of rectangular lid panels having a first edge corresponding in length to a respective top edge of said one pair of walls, and joined thereto through a hingeable fold line of second long edges of lid panel edges having edging panels folded thereto at right angles, the lid panels being configured such that their second long edges and edging panels abut in a closed position of the lid;

releasably interengaging tabs and slots being provided between the lid panels and between top edge panels and respective extension panels, whereby on release of the tabs and slots the carton is unfoldable into a flat carton blank.

Also according to the invention there is provided a carton blank of plastics material sheet foldable into a carton, and comprising;

a rectangular base panel;

a wall panel extending from each edge of the base panel through a fold line allowing folding of each wall panel through at least 90° in either direction from the base panel, opposing wall panels being symmetrical with each other;

extension panels extending from side edges of each of one opposing pair of wall panels through fold lines allowing folding of each extension panel through at least 90° in either direction from the respective wall panel; a top edge panel extending from a top edge of each of the other pair of opposing wall panels through fold lines allowing folding of each top edge panel through 180° in each direction from the respective wall panel;

a rectangular lid panel extending from a top edge of each of the one pair of wall panels through a fold line allowing folding of a lid panel through at least 90° in each direction to the respective wall panel, the lid panels being configured to cover an area similar to that of the base panel;

an edging panel extending from an edge of each lid panel from the fold line between the respective wall panel and the lid panel through a fold line allowing folding of the edging panel in 90° in each of the lid panels;

whereby the blank is reversibly, foldable into a carton having a rectangular base, upstanding walls and a two panel lid, releasably interengaging tabs and slots being provided for engagement of the lid panels in a closed position of the lid in the folded carton and for engagement of the top edge panels with respective extension panels in the folded carton.

BRIEF DESCRIPTION OF THE DRAWINGS

An embodiment of the invention will now be described by way of example with reference to the drawings, in which.

DETAILED DESCRIPTION OF A PREFERRED EMBODIMENT

Figure 1:
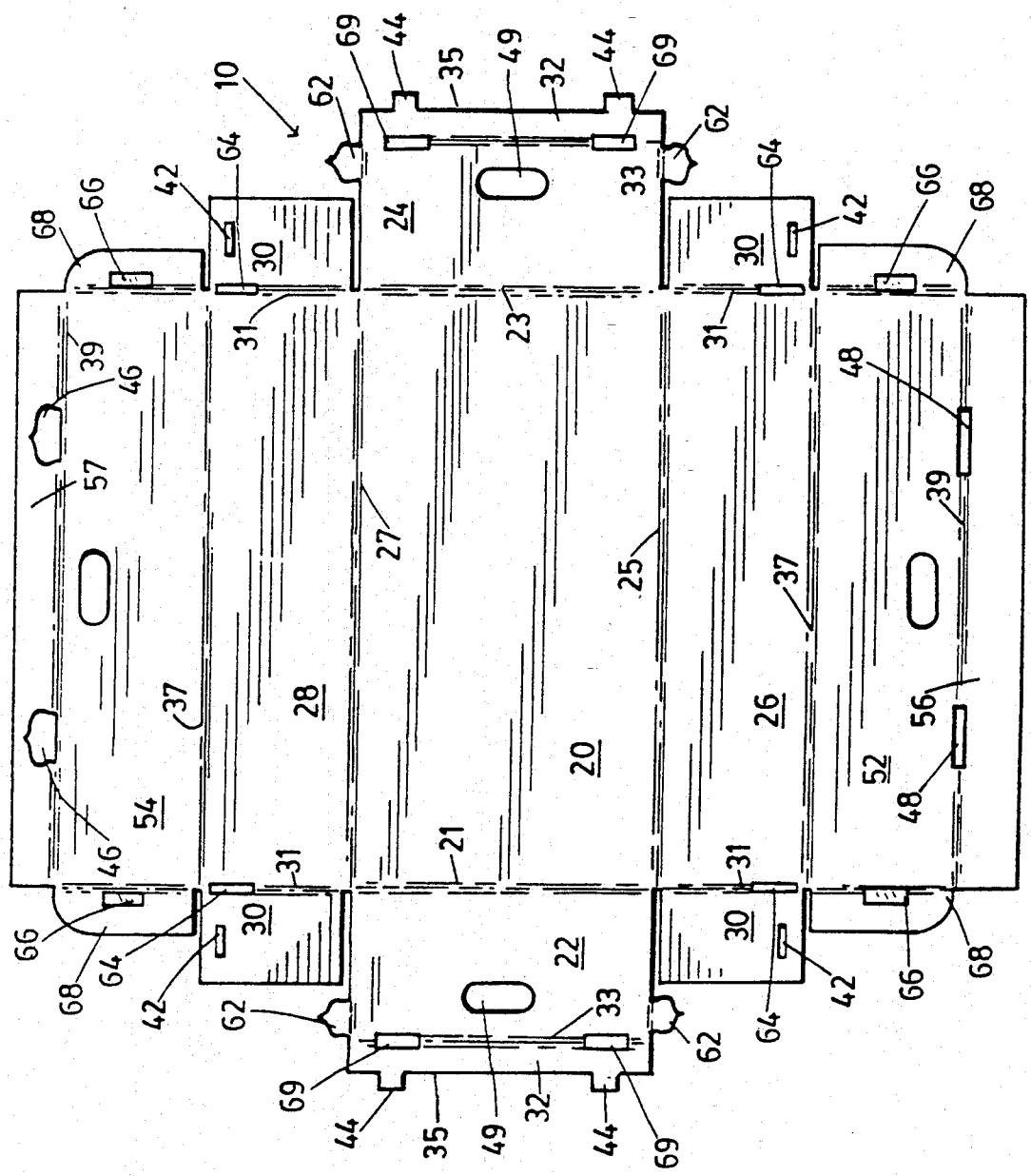
FIG. 1 is an illustration of a carton blank according to the invention.
Figure 2:
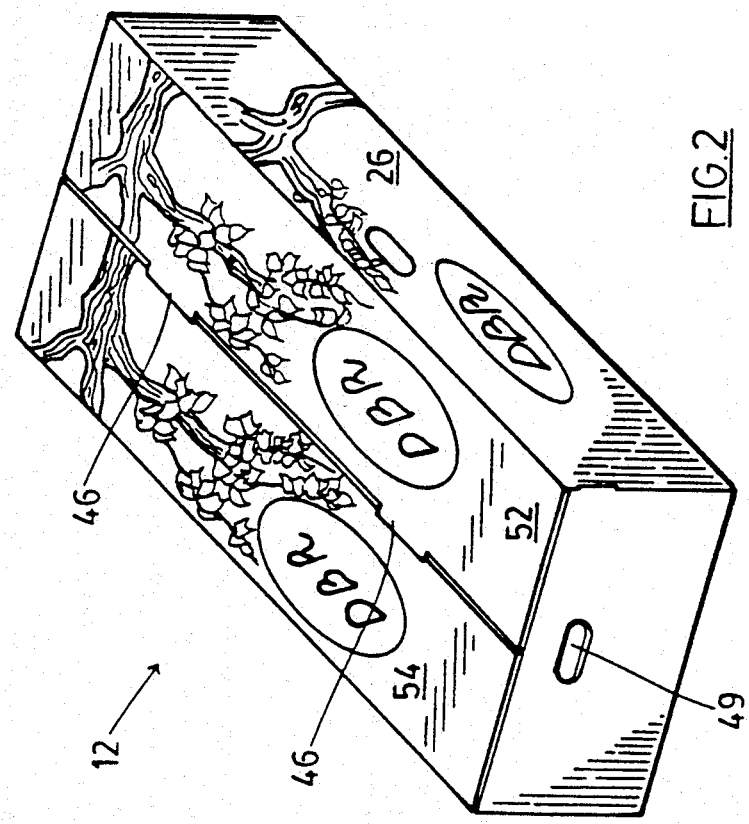
FIG. 2 is an illustration of a folded carton according to the invention.

FIG. 1 illustrates a carton blank 10 which is die stamped in a single operation from recyclable plastics material sheet. The carton blank 10 may be reversibly folded into carton 12 which is illustrated in FIG. 2. By "reversibly folded" is meant the carton blank may be folded so that either of its surfaces forms the inner surface of the carton. Thus it is possible to fold the carton blank into the carton as illustrated in FIG. 2 where illustrated printed material showing on its external surface or, alternatively, it is possible to fold the carton blank 10 with the plain surface which may be seen in FIG. 1 to the outside of the folded carton.

The sheet material from which the carton blank 10 is stamped is of considerable importance. Very suitably the plastics material may be high density polyethylene having an appropriate combination of environmental stress crack resistance (ESCR), stiffness and impact strength, which makes it suitable for use and most food, pharmaceutical, household and industrial chemical applications. One suitable material is SCLAIR 58A (SCLAIR is a registered trademark of Dupont Canada Inc.) or PAXON B50-100 (PAXON is a registered trademark of Allied Corporation). Materials of this type ware not only suitable for forming cartons of sufficient strength and stiffness while allowing provision of fold lines for the bending of panels through up to 180° or even more for some panels, but it is also capable of accepting printing inks and is suitable for packaging containers for food materials.

The cross-section of the coining (fold lines) bay be of V or U or other configuration and the channels may each extend to a depth into the sheet material of from 20% to 75% of its thickness. It is quite possible for coining to comprise two channels, one being pressed into each side of the sheet material but this is unnecessary even when the carton blank is intended for reverse folding. The use of polyethylene or other suitable plastics material allows bending in either direction irrespective of which side of the material 16 coining is provided.

The polyethylene sheet material may be screen printed using UV screen printing inks. These contain photo initiators which, when exposed to a proper wavelength agents for other reactants of the ink frequently creating ozone in the atmosphere. As the printing ink cures it becomes hard to form a permanent film. Especially if printing is carried out on a roughened surface of polyethylene, the resulting film may produce a clean, sharp image with enduring properties. A carton blank as illustrated in FIG. 1 which may be printed on one or both sides, possibly in full four colour printing and may be used over several use cycles with washing and thorough cleaning after each use cycle, the printing remaining sharp and clear for further use of the carton. It is envisaged that up to a 100 use cycles or more may be possible for a single carton blank with washing between each cycle. The considerable number of use cycles which are possible for carton blanks may more than compensate for its possibly greater price over paperboard cartons.

When a carton blank has become unsuitable for further use through deliberate damage, obsolescence, or other reasons, it is recyclable into further cartons or other products. When one or both of its surfaces have been printed, the printing ink may affect the appearance of the recycled product. This, of course, is in dependence of the amount of printing ink present. A possible effect is a speckled appearance in the recycled plastics. This may be minimized by adding dye to the recycled plastic for the provision of coloured recycled products.

If the original carton blank was intended for a beer carton and was pure white in appearance except for printing, then the secondary product may be another similar beer carton of a darker colour of may be a carton for a different purpose.

For such successful recycling, it is important that additional products which would interfere with the quality of the recycled plastic material are not present. Therefore, it is of importance that glues, staples and other packaging aids such as adhesive tapes are not used. Thus the shape of the carton which allows self-interlocking without external aids is also of importance.

The carton blank 10 shown in FIG. 1 comprises a base panel 20 from the edges of which two pairs of opposing walls panels 22, 24 and 26, 28 extend through fold lines 21, 23 and 25, 27. The wall panels 22, 24, 26 and 28 form the walls of the carton shown in FIG. 2. In FIG. 2 only wall panels 26 and 24 are visible. The opposing wall panels 26 and 28 extending from the coined fold lines 25 and 27 along the longer edges of the rectangular base 20 have extension panels 30 joined to their side edges through fold lines 31 to form vertical corners of the carton 12.

The wall panels 22, 24 joined to the shorter edges of the rectangular base 20 through coining 21 and 23, are each provided with a top edge panel 32 extending from the respective edge of panels 22 or 24 remote from coining 21 or 23. Each top edge panel 32 is joined to wall panel 22 or 24 respectively through coining 33 which may be double coining so that top edge panel may bend over at 180° to respective wall panel 22, 24.

The carton blank so far described is not very dissimilar from that for a paperboard beer carton except that it is formed from polyethylene sheet material and does not require the presence of glues or other means of holding the container together, even when used for full beer bottles. Other differences may contribute to other improvements such as the printing, re-usability and reversibility. The structure so far described forms the carton body.

Assembly of the carton body may be by folding the wall panels 22, 24, 26 and 28 upwardly at right angles to the rectangular base panel 20. Extension panels 30 are bent inwardly at right angles about coining 31 to lie in the side wall panels 22 and 24. Coining 21, 23, 25 and 27 are provided to this end. Thereafter, top edge panels 32 are bent down to overlay extension panels 30. Thus, edge panels 32 are bent inwardly and down at 180° to lie flush with extension panels 30.

The semi assembled carton which is obtained by bending the wall panels upwardly 90° to the rectangular base panel and by bending the extension panels 30 inwardly at 90° to the wall panel 26 and 28 and bending the top edge panels inwardly and downwardly at 180° to wall panels 22 and 24 should now be interlocked to hold it together. For this purpose, slots 40 are provided in extension panels 30 located and oriented to cooperate with tabs 42 provided at the longer edges 35 of top edge panel 32. When carton 12 is in its semi assembled condition, tabs 44 are engaged in a corresponding slot 42 of the respective extension panel 30. Conveniently, hand grips apertures 49 are provided in wall panels 22 and 24.

Additional locking tabs 62 and slots 64 may be provided for greater security of the erected carton 12. Thus tabs 62 may be provided at side edges of wall panels 22, 24 to lock into slots 64 located in the coining 31 between wall panels 26, 28 and their respective extension panels. Suitably the tabs 62 have bulbous ends of greater width dimension than that of the slots 64 so that the tabs 46 once forced through the slots 64 will not easily disengage due to strong forces imposed on these.

As illustrated, the surface of carton blank 10 which is shown in FIG. 1 is plain, i.e., unprinted. The reverse surface, however, is printed with illustrative material which may be in full four colours. This is of particular importance for manufacturers' cartons for the retail market, especially a carton such as a beer carton. FIG. 2 shows a carton 12 assembled by bending all the panels about their fold lines so that the plain surface which may be seen in FIG. 1 is to the inside of the carton. Thus, FIG. 2 shows some rudimentary illustration of printing on the outside of the carton. It will be appreciated, however, that all the coining may be provided on the plastics material so that folds may be made in either direction. Thus, it is quite possible and may be desirable in some circumstances to fold carton blank 10 so that the surface shown in FIG. 1 is to the outside of the carton 12.

Once the carton body has been formed the carton may be packed with, say beer bottles. A liner or separator for the beer bottles may be provided if desired, but the resilience of the polyethylene sheet material may provide some shock absorbing effect for the beer bottles, possibly making the provision of a separator less than normally necessary. It is however, clear that it may be desirable to prevent the bottles knocking against each other. If the bottles or other articles packed in the carton are tightly packed some strain will be provided to the tabs 44 locked into the slots 42 to provided friction and possibly adding to the strength of the engagement.

When the carton is loaded, it may be closed by means of lid panels 52, 54 which are symmetric rectangular panels joined along their long edge to the top edges of wall panels 26, 28 through fold lines 37. The lid panels 52, 54 are of a width to meet along their long edges on the central longitudinal axis of the carton. These lid panels have edging panels 56, 57 at least along their long edges remote from coining 37. The edging panels 56, 57 are joined to lid panels 52, 54 through coining 39 which allow the edging panels to be bent at right angles to lid panels 52, 54 in either direction. In fact, in practice, edge panels 56, 57 will be bent downwardly into the carton. Engagement of the lid panels 52, 56 is by means of tabs 46 which are generally rectangular and are stamped out of edge panel 57 on three sides but remain joined to lid panel 54 along coining 39. The tabs 46 engaged in corresponding slots made along the coining 39 between edge panel 56 and lid panel 52. The tabs 46 may be in the form of bulbous tongues to provide for better engagement in the slots 48.

The lid panels 52, 54 may have additional tabs 66 stamped from side edging panels 68 to project outwardly from coining 67 between each lid panel 52 or 54 and the respective side edging panel 68. These tabs 66 may engage slots 69 in the coining between wall panels 22, 24, and their respective top edging panels. Thus tabs 66 may engage the lid panels 52, 54 with the carton body additionally to their engagement with each other.

If the carton is to be used for open storage, lid panels 52, 54 may be folded down inside the carton body to lie flush with respective wall panels 26, 28.

I claim:

1. A carton formed of plastics material comprising:
   a carton body having a rectangular base with a longitudinal axis and a transverse axis;
   two transverse walls folded up from the base at 90°, oriented parallel to the transverse axis of said base and located remotely one from the other at opposite ends of said base;
   two longitudinal walls folded up from the base at 90°, parallel to the longitudinal axis of said base and located remotely one from the other at opposite sides of said base, each of said longitudinal walls having extension panes folded in from opposed ends thereof at 90° to be flush with, and inside, the transverse walls, and, each of said transverse walls having an edge end panel folded at 180° to be flush with and inside said extension panels;
   a lid movable between open and closed position with respect to a carton, the lid comprising a pair of rectangular lid panels each having a first edge corresponding in length to a top edge of one of said longitudinal walls, and joined thereto through a hingeable fold line, and a second edge opposed to said first edge, an edging panel of each of said lid panels being joined to the lid at 90° through a hingeable fold line at said second edge, the lid panels being configured such that said second edges and said edging panels abut in a closed position of the lid;
   releasably inter-engaging tabs and slots being provided between said lid panels, and between each of said top edge panels with respective ones of said extension panels, whereby on release of the tabs and slots, the carton is foldable into a flat carton blank.

2. A carton as claimed in claim 1, in which the plastics material is polyethylene.

3. A carton as claimed in claim 1, in which a wall slot is provided in each extension panel located to engage a corresponding wall tab extending from the respective top edging panel.

4. A carton as claimed in claim 1 in which at least one lid slot is provided between a first one o said two lid panels and its respective edging panel, and at least one corresponding wall tab is provided for interengagement with said lid slot between (the other) a second one of said two lid panels and its respective edging panel.

5. A carton as claimed in claim 4, in which the lid tab is stamped from the respective edging panel and has a fold line with the lid panel.

6. A flat carton blank of plastics material sheet erectable into a carton, and comprising:
   a rectangular base panel having a longitudinal axis and a transverse axis;
   two transverse edges oriented parallel to the transverse axis of said base panel and located remotely one from the other at opposite ends of said base panel;
   two longitudinal edges oriented parallel to the longitudinal axis of said base panel and located remotely one from the other at opposite sides of said base panel;
   a wall panel extending from each edge of said rectangular base through a fold line allowing folding of each wall panel through at least 90° in either direction from the base panel, said wall panels comprising a pair of opposing transverse wall panels extending from the transverse edges, and a pair of longitudinal wall panels extending from the longitudinal edges, each wall panel of each of said pairs of wall panels being symmetrical with the other;
   extension panels each extending form side edges of the longitudinal wall panels through fold lines allowing folding of each extension panel through at least 90° in either direction from its respective wall panel;
   a top edge panel extending from a top edge of each transverse wall panel through a hingeable fold line allowing folding of each top edge panel through at least 180° in each direction to its respective wall panel;
   a rectangular lid panel extending from a top edge of each longitudinal wall panel through a fold line allowing folding of a lid panel through at least 90° in each direction to the respective wall panels, said lid panels being configured to cover an area similar to that of the base panel;
   an edging panel extending from an edge of each lid panel remote from the fold line between said lid panels and its respective wall panel through a fold line allowing folding of the edging panel in 90° in each direction with respect to the lid panel;
   whereby the blank is reversibly foldable into a carton having a rectangular base, upstanding walls and a two panel lid;
   releasably interengaging tabs and slots being provided on opposing lid panels for engagement of the lid panels in a closed position of the folded carton and for engagement of the top edge panels with respective extension panels of the folded carton.

7. A carton blank as claimed in claim 6, in which the plastics material is polyethylene.

8. A carton blank as claimed in claim 6, in which a wall slot is provided in each extension panel located to engage a corresponding wall tab extending from the respective top edging panel.

9. A carton blank as claimed in claim 6 in which at least one lid slot is provided between a first one of said two lid panels and its respective edging panel, and at least one corresponding wall tab is provided for interengagement with said lid slot between a second one of said two lid panels and its respective edging panel.

10. A carton as claimed in claim 9, in which the lid tab is stamped from the respective edging panel and has a fold line with the lid panel.

* * * * *